United States Patent Office 2,716,422
Patented Aug. 30, 1955

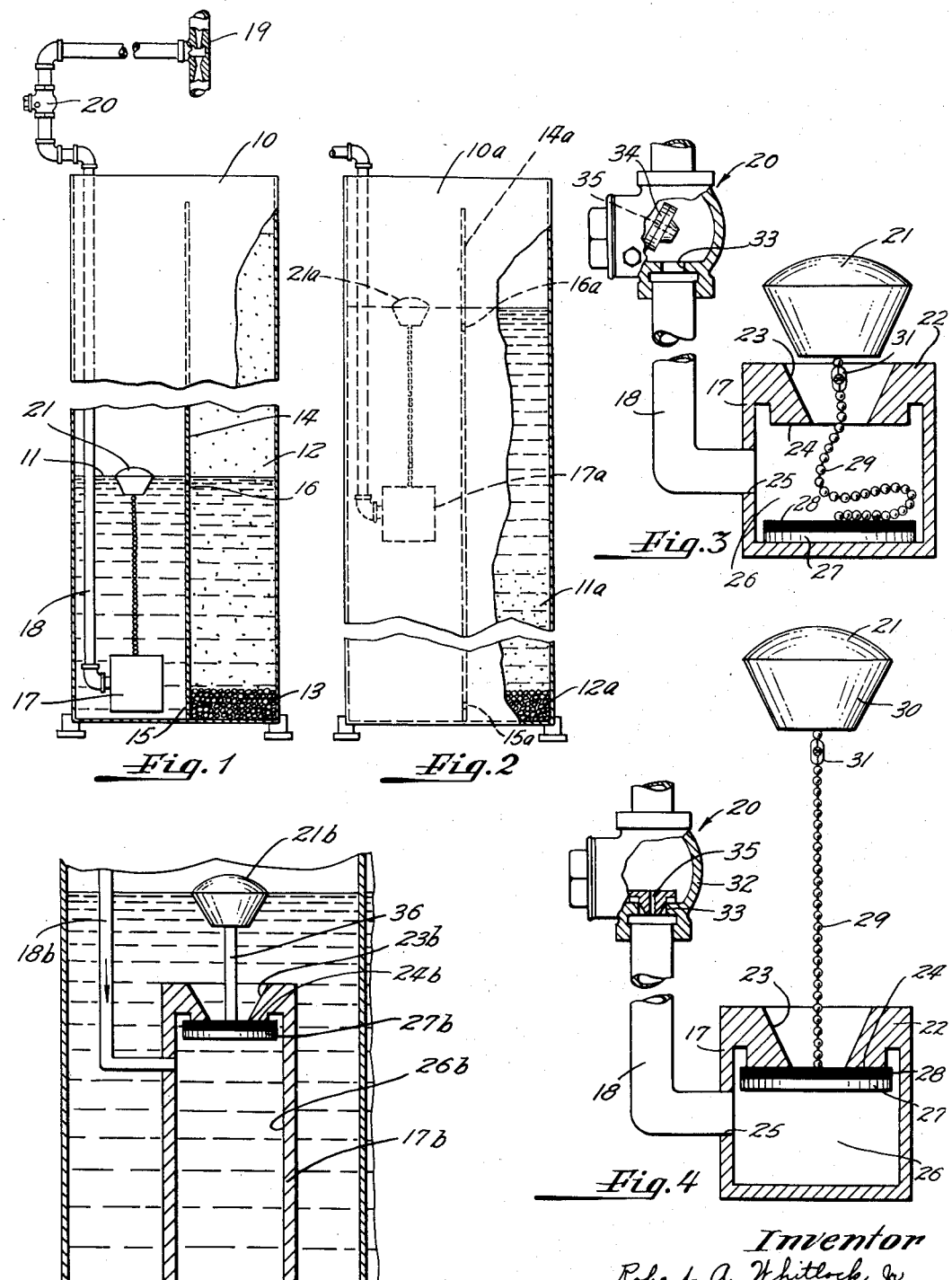

2,716,422

FLOAT VALVE

Robert A. Whitlock, Jr., Rockford, Ill., assignor to Automatic Pump & Softener Corporation, Rockford, Ill., a corporation of Illinois Application January 23, 1953, Serial No. 332,864

17 Claims. (Cl. 137—391)

This invention relates to a float valve, and more particularly to a float valve especially adapted for use in a tank of regenerating material for the regeneration of exchange material in a water treatment apparatus.

It is an object of this invention to provide a novel and improved float valve.

It is also an object of this invention to provide a novel float valve in which the float member carries an upper valve for shutting off the valve of liquid after the liquid level has dropped to a predetermined minimum and in which a lower valve member connected to the float member is operative to shut off the flow of refill liquid after the liquid level has risen to a predetermined maximum.

Another object of this invention is to provide a novel float valve having all of its moving parts arranged to move in vertical alignment to shut off the flow of liquid after the liquid level has dropped to a predetermined minimum and to permit the refill flow of liquid until the liquid level has risen to a predetermined maximum.

Yet another object of this invention is to provide a float valve of novel construction in which all of the metal parts of the valve are submerged at all times.

A further object of this invention is to provide a novel float valve of extremely simple and economical construction requiring no close manufacturing tolerances, which is extremely compact in size and has a minimum of moving parts, and which is simple, trouble-free, and completely automatic in its operation.

A still further object of this invention is to provide a novel float valve which has provision for limiting the rate of refilling of the container whose liquid level the float valve controls so as to prevent premature closing of the valve before the desired liquid level in this container has been attained.

It is also an object of this invention to provide a novel float valve which, in addition to being adapted for use in brine tanks in which all of the salt is submerged, is also readily adapted for use in brine tanks in which only a lower strata of salt is submerged and in which dry salt may be stored above this strata of submerged salt.

Other objects and advantages of the invention will be apparent from the following description of two embodiments thereof, which are shown in conjunction with brine tanks for use with a water softener in order to illustrate one practical use to which the invention may be put.

In the drawing:

Figure 1 is a longitudinal section of an assembly of the float valve of the present invention in a brine tank which has only a portion of its salt submerged;

Figure 2 is a view similar to Fig. 1 and showing the float valve in the brine tank in which all of the salt is submerged;

Figure 3 is a longitudinal section through the Fig. 1 float valve and its associated check valve, showing the position of the parts when the liquid level is dropping to a predetermined minimum;

Figure 4 is a view similar to Fig. 3 but showing the parts just after the liquid level has risen to a predetermined maximum; and Figure 5 is a section through an assembly of an alternative float valve according to the present invention in a brine tank.

The present invention is a continuation in part of the application Serial No. 261,260, filed December 14, 1951, and since abandoned.

Referring to Fig. 1, there is shown a brine tank 10 in which it is desired to have the highest liquid level at 11, well below the top of the tank. This tank contains a large volume of salt 12, only part of which is below the upper liquid level 11. The remainder of the salt above this liquid level is dry and the brine tank itself forms a storage container for this salt which is ultimately used to replenish the submerged salt. At the bottom of the tank there is provided a bed 13 of gravel which serves as a filter or screen preventing the escape of solid particles of salt to the float valve, as will be described in detail hereinafter. A partition 14 extends upright across the brine tank 10 from the bottom of the tank to a level somewhat below the top of the brine tank. This partition 14 divides the brine tank into a salt storage chamber and a chamber in which the float valve operates.

The partition 14 is formed with an opening 15 adjacent its lower end so that brine is permitted to pass from the submerged salt bed down through the gravel bed 13, where the solid salt particles are filtered out, and thence through the opening upwardly into the chamber in which the float valve operates. The partition 14 is also formed with an additional opening 16 located slightly below the upper liquid level in the brine tank.

The float valve includes a casing 17, which in the Fig. 1 assembly is located adjacent the bottom of the brine tank. Discharge and refill pipe 18 extends upwardly from the housing of the float valve and out of the brine tank to the ejector 19 of the water treatment apparatus (not shown) whose exchange material is to be regenerated by the brine in the brine tank. A check valve, indicated generally at 20 in Fig. 1, is located in the discharge and refill pipe 18 ahead of the ejector. A float member 21, which forms a part of the float valve assembly is positioned above the top of the float valve housing 17 and is adapted by its position to control the liquid level in the brine tank, as described in detail hereinafter.

Referring to Figs. 3 and 4, the casing 17 of the float valve is generally cylindrical in configuration. The casing 17 has a closed bottom wall and at its upper end is formed with a thickened top wall 22 in which is formed a frusto-conical passage 23 leading down into the interior of the float valve casing 17. The under side of the top wall 22 of casing 17 defines a flat, horizontal, annular lower valve seat 24 at the lower end of passage 23. Below its top wall the casing 17 has its upstanding side wall apertured at 25 to receive the discharge and refill pipe 18.

Within the chamber 26 in casing 17 below passage 23 there is located a lower valve disk 27 which carries a facing 28 of resilient material, such as rubber, on its upper face. The disk 27 is quite loosely received in the casing chamber 26. A metal bead chain 29 of corrosion resistant material such as stainless steel, nickel, chrome alloy or the like is connected to the lower end of the float member 21 and to the upper face of the disk 27 and extends down through the passage 23 to provide a collapsible or limp connecting member interconnecting float 21 and disk 27. The float member 21 is preferably in the form of a sealed fuller ball of soft rubber, and is of frustoconical configuration at its lower end to provide a valving face 30 shaped complementary to the passage 23 so as to be adapted to seat snugly therein to block the passage. The resilient facing 28 carried by the lower valve disk 27 is adapted to seat against the flat annular lower valve seat 24 to block the flow of liquid through the passage 23. The bead chain 29 is in two sections interconnected by a separable coupling member 31 of conventional construction, which enables the length of the bead chain to be adjusted as desired.

It is to be understood that, if desired, the bead chain 29 may be replaced by any suitable limp connecting member for interconnecting the float member 21 and the lower valve disk 27 which is adapted to be slack or collapsed when the float member is lowered, as shown in Fig. 3. The illustrated bead chain construction of the connecting member is preferred because of the convenience in adjusting its length, as described, and because it is not susceptible to becoming kinked or knotted when in its slack or collapsed condition.

The check valve 20 located in the discharge and refill line includes a casing 32 haivng a cylindrical passage 33 at its lower end at which a pivoted valve 34 is adapted to seat (Fig. 4). The valve 34 is of known construction and has a central passage 35 extending through it, for a purpose described hereinafter.

In the operation of the float valve of Figs. 3 and 4 in the brine tank shown in Fig. 1, it is assumed that initially the brine tank is filled to the desired maximum level at 11. At this time, the float member 30 is at the upper liquid level in the tank and, as shown in Fig. 4, through its connection by means of chain 29 to the lower valve disk 27, positions this lower valve disk seated against the lower valve seat 24. At this time, the check valve 34 is closed, as shown in Fig. 4.

When it is desired to withdraw brine from the brine tank 10, by the action of water passing through the ejector 19 a suction is created in the pipe 18 for drawing brine from the tank 10. This suction in pipe 16 causes check valve 34 to lift away from its seat and also draws liquid upwardly through pipe 18 from the chamber 26 in the float valve casing 17. This suction also causes the lower valve disk 27 of the float valve assembly to move downward away from its seat 24 and unblock the lower end of the passage 23. Brine above the level of the top of the float valve casing 17 flows down through the passage 23 into float valve chamber 26, from which it is withdrawn up through pipe 18 past check valve 34 to the ejector 19 (Fig. 3). After a predetermined amount of brine has thus been withdrawn from the brine tank, the liquid level thereat will have dropped to lower the valve face 30 on the float valve member 21 into seating engagement with the upwardly facing, frusto-conical valve seat defined by passage 23. The float member thus blocks the passage 23 leading down into the float valve casing and prevents further flow of brine into the float valve casing. Thereafter, as long as a suction is maintained in the pipe 18 the float member 21 will be maintained seated in this manner by a force which is equal to approximately the area of the upper valve seat at 23 at its mean diameter times the difference in pressure above and below the float member 21. The pressure above the float member 21 is atmospheric since the tank is in open communication with the atmosphere at its upper end, while the vacuum in the float valve casing 17 below the upper valve seat is determined by the control apparatus which exerts a suction in pipe 18.

Later during the operation of the water treatment apparatus water pressure is again supplied to pipe 18 and the brine tank is automatically refilled to its former level. When this occurs, the check valve 34 returns to its seated position and refill water passes down through passage 35 in the check valve into the float valve casing 17. The water thus passing downward through pipe 18 into the float valve casing 17 gradually rises up into the passage 23 in the float valve casing and then lifts the float member 21 upward away from the upper valve seat at passage 23. Since the passage 35 through check valve 34 provides only a restricted rate of flow of refill water into the float valve chamber 26 it insures that the lower valve disk 27 is not forced upwardly into engagement with its valve seat 24 prematurely. As the float member 21 continues to rise it ultimately lifts the lower valve disk 27 into seating engagement with the lower valve seat 24. This terminates the refill of the brine tank, with the lower valve disk 27 being maintained seated against the lower valve seat 24 by water pressure at its under side and by the float member 21. Thus, the float valve parts have returned to the position shown in Fig. 4, where they will remain until a suction is again established in pipe 18.

In the assembly of Fig. 2, the brine tank 10a contains a salt bed 11a which is completely submerged at all times. Gravel bed 12a is located at the bottom of this tank in like manner and for the same purpose as in the Fig. 1 assembly. Likewise, the partition 14a divides the brine tank into a salt chamber and a chamber in which the float valve operates. This partition extends up from the bottom of the brine tank to above the upper liquid level therein and is formed with a hole 15a at the gravel bed 12a and a hole 16a just below the upper liquid level in the tank. Since the liquid level in the brine tank is to be maintained at a higher level, the float valve casing 17a is supported at a higher elevation within the brine tank than in the Fig. 1 assembly. The upper level of the brine in the brine tank is determined by the height to which the float member 21a may rise, while the lower level of the brine is determined by the seating of the float member 21a against the upper valve seat formed at the top passage in the valve casing 17a. The float valve itself is constructed as shown in Figs. 3 and 4 and operates in the same manner, as already described in connection with the Fig. 1 assembly.

Obviously, in the float valve of Figs. 3 and 4, the adjustability of the length of bead chain 29 enables the amount of brine withdrawn from the brine tank in any given cycle to be selectively controlled, since the length of this chain determines the upper liquid level in the brine tank.

In Fig. 5 there is shown an alternative embodiment of the float valve, which differs from the embodiment shown in Figs. 3 and 4 in that the connecting member which interconnects the float and the lower valve disk is a rigid stem 36, rather than a flexible chain. The float valve assembly of Fig. 5 also includes a float member 21b and a lower valve disk 27b, both identical to the corresponding elements in the float valve of Figs. 3 and 4. The float valve casing 17b in Fig. 5 is similarly formed at its top wall with a frusto-conical downwardly extending passage 23b, at which the float member 21b is adapted to seat, and a flat annular valve seat 24b extending around the lower end of passage 23b, against which the lower valve disk 27b is adapted to seat. The valve casing 17b is generally cylindrical in configuration and its internal chamber 26b is considerably deeper than in the first-described embodiment of the float valve, in order to accommodate the stem 36 when the float member 21b is lowered as brine is withdrawn from the tank. The rod 36 is preferably quite loosely received in the passage 23b, so as to avoid any possibility of becoming struck therein due to salt deposits over a long period of use.

The operation of the Fig. 5 float valve is essentially similar to that of the float valve shown in Figs. 3 and 4. When a suction is created in pipe 18b, the lower valve disk 27b in float valve chamber 26b is lowered away from valve seat 24b, to thereby unblock passage 23b and permit liquid in the brine tank above the level of the top of float valve casing 17b to pass down through passage 23b into the float valve chamber 26b and thence out through pipe 18b. This withdrawal of liquid from the brine tank continues until the float member 21b seats at passage 23b, to thereby prevent further withdrawal of liquid. Thereafter, the brine tank may be refilled through the float valve to the desired maximum level, as determined by the length of rod 36 interconnecting the float 21b and the lower valve disk 27b.

From the foregoing description, it will be apparent that the float valve of the present invention has a minimum of moving parts and has no close dimensional tolerances for these parts. And since all the parts of the float valve are completely submerged at all times except the float member 21 salt deposits are avoided and these parts may be made of steel, rather than of the more expensive brass, since the steel parts will not rust appreciably while submerged. In addition, it will be apparent from the foregoing description that the float valve of the present invention is completely automatic in its operation and is quite compact in size since the valve movement is vertical and in alignment with the axis of the float member.

While in the foregoing description there are disclosed two specific embodiments of the present invention, it is to be understood that the invention is susceptible of various other embodiments and that various modifications, omissions and refinements departing from the described form of the invention may be adopted without departing from the spirit and scope of this invention. For example, the upper valve member of the float valve need not be provided by the underside of the float member, as in the illustrated embodiments of the invention, but may be a separate valve member located below the float member and connected to the float member to move in unison therewith.

I claim:

1. A float valve of the type submerged in a liquid container comprising a casing having an internal chamber, a first passage leading downwardly into said chamber and a second passage arranged for connection to a conduit, an upper valve seat around said first passage, a lower valve seat within the chamber disposed around said first passage, a lower valve member in said chamber shaped to seat against the lower valve seat to close said first passage against egress of liquid, an upper valve means disposed outside the casing shaped to seat against the upper seat to close said first passage against the ingress of liquid, a float secured to said upper valve member for moving the upper valve member toward and away from the upper seat with changes in liquid level surrounding the casing, and a connection between the float and the lower valve member for moving the lower valve member to closed position when the float reaches a position defined by an upper liquid level.

2. The apparatus of claim 1, wherein said connection means is collapsible.

3. The apparatus of claim 1, wherein said upper valve means is integral with the float member.

4. The apparatus of claim 1, wherein said upper valve means is defined by the underside of the float member shaped complementary to said upper valve seat.

5. A float valve for controlling liquid flow from and into a liquid container, comprising a casing adapted to be disposed within the container and having an internal chamber, said casing being formed with a first passage extending downwardly from outside said casing into said chamber therein, means defining an upwardly facing upper valve seat at said passage, means defining a downwardly facing lower valve seat at the lower end of said passage, a float member disposed outside the casing above said passage therein and having an under side shaped to seat on the upper valve seat to block said passage when the float member is lowered thereagainst, a lower valve member within said chamber in the casing shaped to seat against said lower valve seat when raised thereagainst, a rigid stem having a length less than the depth of said casing chamber extending loosely up through said passage and interconnecting the lower valve member and the lower end of the float member, and a second passage communicating with said chamber for passing liquid from and into said chamber, said float member in response to the flow of liquid from said second passage into said chamber and thence up through said first passage moving upwardly away from said upper valve seat to permit liquid to flow through said first passage upward past said upper valve seat until the float member lifts the lower valve member to seat against said lower valve seat to block said first passage and terminate the flow of liquid upward therethrough, said lower valve member in response to the flow of liquid from said chamber out through said second passage moving downward away from said lower valve seat to permit liquid to flow downward through said first passage into said chamber until said float member is lowered to seat against said upper valve seat to block said first passage and terminate the flow of liquid downward through said first passage.

6. A float valve comprising a casing having an internal chamber, means defining a passage leading downwardly from outside the casing into said chamber therein, an upper valve seat at said passage, a lower valve seat at said passage, a float member above said casing adapted to be lowered toward said upper valve seat, upper valve means disposed outside said casing and movable in unison with said float member to seat on said upper valve seat and block said passage when the float member is lowered, a lower valve member in said chamber adapted to seat on said lower valve seat to block said passage, connection means extending through said passage and interconnecting said float member and said lower valve member, said float member when raised above said upper valve seat lifting said lower valve member to seat against said lower valve seat, said connection means including a lost motion connection permitting said upper valve means to seat against said upper valve seat when the float member is lowered, a discharge conduit communicating with said chamber for selectively passing liquid from said chamber or passing refill liquid back into said chamber, and a check valve in said conduit operable to open fully when liquid flows from said chamber through said conduit and operable to restrict flow to said chamber when liquid flows through said conduit back into said chamber.

7. A float valve for submersion in a liquid container comprising a casing having an internal chamber, means defining a first passage leading downwardly from outside said casing into said chamber therein, means defining a second passage leading from said chamber and arranged to selectively pass liquid into and from said chamber, a check valve in said second passage operative to restrict flow of liquid into said chamber from said second passage, an upper valve seat at said first passage, a lower valve seat at said first passage, a float member located above said casing and carrying upper valve means disposed outside said casing and positioned to selectively seat on said upper valve seat and move upwardly away therefrom, a lower valve member in said chamber in the casing positioned to selectively seat against said lower valve seat and move downwardly away therefrom, and connection means interconnecting said float member and said lower valve member, said float member in response to the flow of liquid from said second passage into said chamber and thence upward through said first passage rising away from said upper valve seat and lifting said lower valve member into engagement with said lower valve seat, said lower valve member in response to the flow of liquid from said chamber out through said second passage being movable to a position away from said lower valve seat at which said connection means enables said float member to lower said upper valve means to seat against said upper valve seat.

8. The apparatus of claim 1 wherein the connection means comprises a corrosion resistant bead chain.

9. The apparatus of claim 1 wherein the float member and upper valve means comprises a sealed fuller ball.

10. A float valve of the type submerged in a liquid container comprising a casing having an internal chamber, a first passage leading downwardly into said chamber and a second passage arranged for connection to a conduit, an upper valve seat around said first passage, a lower valve seat within the chamber disposed around said first passage, a lower valve member in said chamber shaped to seat against the lower valve seat to close said first passage against egress of liquid, an upper valve means disposed outside the casing shaped to seat against the upper seat to close said second passage against the ingress of liquid, a float secured to said upper valve member for moving the upper valve member toward and away from the upper seat with changes in liquid level surrounding the casing, and a lost motion connection between the float and the lower valve member for moving the lower valve member to closed position when the float reaches an elevated position defined by an upper liquid level.

11. A float valve of the type submerged in a liquid container comprising a casing having an internal chamber, a first passage leading downwardly into said chamber and a second passage arranged for connection to a conduit providing communication between the exterior of the casing and the conduit by way of the chamber and passages, an upper valve seat around the first passage, a lower valve seat in the chamber around the first passage, a lower valve member in said chamber shaped to seat against said lower seat, an upper valve means disposed outside the casing shaped to seat against the upper seat to close said first passage, a float attached to said upper valve member for moving the same toward the upper seat with drop in level of the liquid surrounding the casing as liquid flows into the chamber through said first passage to seat and terminate the flow at a low liquid level, and a lost motion connection between the float and the lower valve member for moving the lower valve member to closed position to terminate flow out of the chamber through the first passage when the float reaches an elevated position defined by an upper liquid level.

12. A float valve of the type submerged in a liquid container comprising a casing having an internal chamber, a first passage leading downwardly into said chamber and a second passage arranged for connection to a conduit providing communication between the exterior of the casing and the conduit by way of the chamber and passages, an upper valve seat around the first passage, a lower valve seat in the chamber around the first passage, a lower valve member in the chamber shaped to seat against the lower valve seat in an upper closed position and weighted to gravitate to a lower open position, an upper valve means disposed outside the casing shaped to seat against the upper seat to close said first passage against ingress of liquid, a float attached to said upper valve member for moving the same toward the upper seat with drop in level of the liquid surrounding the casing as liquid flows into the chamber through said first passage to seat and terminate the flow at a low liquid level, and a lost motion connection between the float and the lower valve member for moving the lower valve member to closed position when the float reaches a position defined by an upper liquid level.

13. The combination recited in claim 1 wherein the first passage extends through a top wall of the casing and the second passage terminates in the chamber at an opening in a side wall thereof above the lower valve element when the latter occupies its lower open position.

14. The combination recited in claim 1 wherein the first passage extends through a top wall of the casing and the second passage terminates in the chamber in a side wall thereof at a point intermediate the lower valve seat and the lower valve member when the latter occupies its lower open position.

15. A float valve of the type submerged in a liquid container comprising a casing having an internal chamber, a first passage leading downwardly into said chamber and a second passage arranged for connection to a conduit providing communication between the exterior of the casing and the conduit by way of the chamber and passages, an upper valve seat around the first passage, a lower valve seat in the chamber around the first passage, an upper valve means disposed outside the casing shaped to seat against the upper seat to close said first passage against ingress of liquid to the chamber in response to subatmospheric pressure in the second passage, a float attached to said upper valve member for moving the same toward the upper seat with drop in level of the liquid surrounding the casing to seat in the direction of flow and terminate the flow at a low liquid level and to unseat in response to superatmospheric pressure at the second passage and liquid flow into the chamber and out through the first passage, a lower valve member in the chamber weighted to gravitate to a lower open position spaced from the lower valve seat, and a connection between the float and the lower valve member for moving the latter toward the lower seat when the float reaches an elevated position defined by an upper liquid level to close the first passage by movement of the valve member in the direction of liquid flow, said connection comprising a lost motion connection providing preliminary motion of the float independent of the lower valve member terminating in coordinated movement of the valve member by the float.

16. The combination recited in claim 1 wherein said connecting means comprises a rigid member extending upwardly through the passage and connecting the lower valve and the float.

17. The combination recited in claim 1 having a check valve in said second passage to control flow therethrough, operable to open when liquid flows from said chamber out through said second passage and operable to restrict the rate of flow to said chamber when liquid flows through said second passage into said chamber.

References Cited in the file of this patent

UNITED STATES PATENTS

| 214,463 | Smith | Apr. 15, 1879 |
| 576,340 | Courtney | Feb. 2, 1897 |
| 602,525 | Scott | Apr. 19, 1898 |
| 748,515 | McComb | Dec. 29, 1903 |
| 1,259,791 | Simmons | Mar. 19, 1918 |

FOREIGN PATENTS

| 1,064 | Great Britain | 1864 |
| 23,943 | Great Britain | 1903 |
| 70,439 | Germany | 1893 |
| 354,739 | France | 1905 |